Patented Jan. 6, 1931

1,787,581

UNITED STATES PATENT OFFICE

MORRIS S. KHARASCH, OF COLLEGE PARK, MARYLAND, ASSIGNOR TO E. I. DU PONT DE NEMOURS & COMPANY, OF WILMINGTON, DELAWARE, A CORPORATION OF DELAWARE

GERMICIDES, FUNGICIDES, ETC., FOR SOIL STERILIZATION AND METHODS OF USING THE SAME

No Drawing. Application filed November 10, 1926. Serial No. 147,616.

This invention relates to the treatment of infections of soil, and more particularly to the use of mercury and other compounds in conjunction with a fertilizer and its application to the infected soil.

This case is a continuation in part of my application, Serial No. 666,989, filed October 6, 1923.

In the past small grains and potatoes have been protected from external infections by the use of hot water, formaldehyde, mercuric chloride or copper sulfate. As an illustration of the prior art, the use of formaldehyde or hot water may be cited. The grain is soaked in such a solution for a period of time, then dried and sown. The main object of such a treatment has been to kill the surface fungus and other infection. The dipping of potatoes in a dilute solution of mercuric chloride has had a similar object in view, namely, the elimination of the parasite known as potato scab.

Such proprietary treatments, however, are accompanied by considerable danger, particularly in the case of grain, as it has been found that the vitality of the grain broken during threshing is not only impaired by the chemical but the formaldehyde treatment has a depressing effect on the germination of the seed and also affects the vigor of the plant. The result is that the grain does not germinate properly, if at all. There is the further disadvantage and danger by the fact that the grain may not be immediately sown, and, therefore, may germinate before being put into the ground. For these reasons this method of seed disinfection has to a considerable extent been limited.

In the application referred to above, I have described organic mercurials which are practically non-toxic to germination and which are very effective when applied in a solid condition. However, this method of treatment, while having a decided advantage over the other methods, yet has in it inherently a feature which must not be overlooked, i. e., it applies only to the disinfection of the material planted and does not take into account the condition of the soil. The treatment is, therefore, applicable and effective only if the soil is free from organisms causing fungus infections, scab on potatoes, and the like. However, if the soil is not free from infection, as soon as the superficial coating of the material is washed away, or as the grain increases in size, it is exposed at once to the fatal action of the bacteria, with consequent loss. It is comparable with planting perfectly healthy certified seed in infected soil wherein the yield is always poor and the material obtained shows the result of the ravishing infection; thus, healthy certified potatoes planted in soil containing the organism commonly known as scab, show deep lesions and are practically useless either for home consumption or as a marketable product.

It is evident, therefore, that in order to attain the best results, some other treatment is essential. This may be accomplished in the same manner as the disinfection of the grain, namely, the disinfection of the soil. Thus, the disinfecting agent, preferably an organic mercurial, may be mixed with a fertilizer. Two ends are accomplished at the same time—the soil is fertilized and the infection contained in the soil is brought under control. The seed, previously disinfected, has then a chance to develop unhampered by the pathogenic bacteria of the soil. The value of this method of soil disinfection can be readily appreciated from the fact that healthy certified potatoes when placed in soil heavily infested with scab gave about fifty per cent. of potatoes which had deep lesions and were of no economic value, while heavily scabbed, practically useless potatoes, when surface disinfected with an organic mercurial and placed in the same plot of soil which had been disinfected by mixing an organic mercurial with the fertilizer, gave a yield of sixty per cent. of potatoes, perfectly healthy, and, while the rest showed some scab lesions, none of them approached in severity those obtained in the healthy certified potatoes, placed in the soil infected with scab.

The object of my invention is the treatment of soil infections. A further object of my invention is the mixing with a fertilizer of an active bactericidal agent possessing low toxicity for the seed and plant.

These objects are accomplished by the following invention in which I have found that organic compounds containing mercury attached to a carbon atom are very valuable in the treatment of soil infections. Such mercurials include the mercurized nitranilines, the mercurized nitrophenols, the mercurized chlorophenols, the mercurized chlorocresols, and similar mercuro-compounds. Also, mercury compounds in which one or both of the valences of the metal is attached to nitrogen or oxygen may be employed.

Furthermore this invention embraces the incorporation into the fertilizer of other bactericidal agents suitable for eliminating the pathogenic bacteria in the soil which attack the healthy seed. Such bactericidal agents are the soluble organic mercury compounds, as for instance, sodium salt of mercurized chlorophenol and the alkali salts of mercurized nitrophenol, or mercurized naphthols. Also, the mercurized organic carboxylic acids or mercurized sulfonic acids may be used. Furthermore, other derivatives like inorganic mercury salts, mercury oxide, mercury salt of organic acids and mercury derivatives of amides and imides such as mercury acetamide, or mercury succinimide may likewise be used. It has also been found that bactericidal agents not related to mercury may be used, such as formaldehyde phenol derivatives, benzoic acid, and the like. It has been found that besides possessing a marked fungicidal value, these compounds demonstrate a stimulation of germination of the seed or plant.

The incorporation of the bactericidal agent with the fertilizer is of course of tremendous economic importance, is time saving and of little expense as far as the item of labor is concerned. The percentage of bactericidal agent necessary to be incorporated with the fertilizer depends upon the extent of the soil infection. Usually a proportion of one part of the bactericidal agent to 400 parts of the fertilizer is sufficient, but two, four, five, and even ten per cent. of the bactericidal agent may sometimes be required. With fertilizer treated in this way there is the added advantage that the soil to which it is to be applied is thereby protected against infection.

This fertilizer bactericidal agent composition should be particularly useful in greenhouses. Yearly, large quantities of soil must be removed from the greenhouses and replaced by new soil, due to the fact that the soil has become infected. The advantages of the use of such a fertilizer composition, comprising an organic mercurial and a fertilizer are from the foregoing self-evident.

As many apparently widely different variations of this invention may be made without departing from the spirit thereof, it is to be understood that I do not limit myself to the foregoing examples or description except as indicated in the following patent claims.

I claim:

1. The method of treating soil for the control of plant diseases, which comprises incorporating into the soil a mixture of a fertilizer and a mercury compound.

2. A composition for the treatment of soil for the purpose of controlling plant diseases, containing a fertilizer and a mercury compound.

3. A composition for the treatment of soil for the purpose of controlling plant diseases, containing a fertilizer and an organic mercury compound.

4. A composition for the treatment of soil for the purpose of controlling plant diseases, containing a fertilizer and a compound of the type R—Hg—X, in which R represents an organic radicle and X represents a radicle taken from a group including organic and inorganic radicles.

5. A composition for the treatment of soil for the purpose of controlling plant diseases, containing a fertilizer and a compound of the type R—Hg—X, in which R represents an organic radicle to which the mercury is attached through a carbon atom, and X represents a radicle taken from a group including organic and inorganic radicles.

6. A composition for the treatment of soil for the purpose of controlling plant diseases, containing a fertilizer, and a mercurized phenol.

7. A composition for the treatment of soil for the purpose of controlling plant diseases, containing a fertilizer, and a mercurized chlorphenol.

In testimony whereof I affix my signature.

MORRIS S. KHARASCH.